(12) United States Patent
Panguloori et al.

(10) Patent No.: US 9,912,155 B2
(45) Date of Patent: Mar. 6, 2018

(54) CONTROLLING POWER FROM CABLE TO LOAD

(71) Applicant: PHILIPS LIGHTING HOLDING B.V., Eindhoven (NL)

(72) Inventors: Rakeshbabu Panguloori, Bangalore (IN); Priya Ranjan Mishra, Bangalore (IN)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 215 days.

(21) Appl. No.: 14/894,412

(22) PCT Filed: May 22, 2014

(86) PCT No.: PCT/EP2014/060530
§ 371 (c)(1),
(2) Date: Nov. 27, 2015

(87) PCT Pub. No.: WO2014/191297
PCT Pub. Date: Dec. 4, 2014

(65) Prior Publication Data
US 2016/0126736 A1 May 5, 2016

(30) Foreign Application Priority Data
May 31, 2013 (EP) .................... 13170149

(51) Int. Cl.
H02J 3/14 (2006.01)
H05B 37/02 (2006.01)

(52) U.S. Cl.
CPC ............ *H02J 3/14* (2013.01); *H05B 37/0245* (2013.01); *H05B 37/0254* (2013.01); *H05B 37/0272* (2013.01)

(58) Field of Classification Search
CPC ... H02J 3/14; H05B 37/0245; H05B 37/0254; H05B 37/0272
See application file for complete search history.

(56) References Cited

U.S. PATENT DOCUMENTS 7,471,051 B1    12/2008   Wacknov et al.
2010/0295474 A1 11/2010   Chemel et al.
(Continued)

FOREIGN PATENT DOCUMENTS

WO   2008112181 A2   9/2008
WO   2009129232 A1   10/2009
WO   2011148378 A2   12/2011

OTHER PUBLICATIONS

Drenker, Steven, et al., "Noninstrusive Monitoring of Electric Loads," IEEE, Oct. 1999 (5 Pages).
(Continued)

*Primary Examiner* — Robert Deberadinis
(74) *Attorney, Agent, or Firm* — Akarsh P. Belagodu

(57) ABSTRACT

Devices (1) for controlling gates (21-24) arranged to control amounts of power to be supplied to loads (51-54) via cables (2) may comprise receivers (11) for receiving requesting signals from the gates (21-24), analyzers (12) for analyzing requests defined by the requesting signals in view of available cable power capacities, generators (13) for in response to analysis results generating instructions for the gates (21-24) and transmitters for transmitting instructing signals defining the instructions to the gates (21-24). The analyzers (12) may analyze the requests in view of load-information comprising steady-state-information/transient-state-information. The devices (1) may comprise communicators (15) for communication with auxiliary converters (31-33) coupled to auxiliary sources (41-43) such as batteries (41) and solar panels (42, 43) and may comprise predictors (16) for predicting the available cable power capacities. The
(Continued)

improved devices (1) are no longer informed afterwards by the gates (21-24) but are informed beforehand by the gates (21-24) and control these gates (21-24) in response to the analysis results.

15 Claims, 2 Drawing Sheets

(56) References Cited

U.S. PATENT DOCUMENTS

| | | |
|---|---|---|
| 2011/0040420 A1 | 2/2011 | Lenox |
| 2011/0282514 A1 | 11/2011 | Ropp et al. |
| 2012/0245744 A1 | 8/2012 | Prosser et al. |
| 2012/0261990 A1 | 10/2012 | Collins et al. |
| 2012/0271470 A1 | 10/2012 | Flynn et al. |
| 2012/0280565 A1 | 11/2012 | Logvinov |

OTHER PUBLICATIONS

Davito, Brandon, et al., "The Smart Grid and the Promise of Demand-Side Management," McKinsey on Smart Grid, 2010 (7 Pages).

Indeco Strategic Consulting, Inc., "Demand Side Management and Demand Response in Municipalities," Jan. 2004 (25 Pages).

CONTROLLING POWER FROM CABLE TO LOAD

CROSS-REFERENCE TO PRIOR APPLICATIONS

This application is the U.S. National Phase application under 35 U.S.C. § 371 of International Application No. PCT/EP2014/060530, filed on May 22, 2014, which claims the benefit of European Patent Application No. 13170149.2, filed on May 31, 2013. These applications are hereby incorporated by reference herein.

FIELD OF THE INVENTION

The invention relates to a device for controlling a first gate, the first gate being arranged to control a first amount of power to be supplied to a first load via a cable. The invention further relates to a method, to a computer program product and to a medium.

Examples of such a device are energy managers.

BACKGROUND OF THE INVENTION

US 2012/0280565 A1 discloses a system and a method for an intelligent power controller and discloses in its paragraph 0036 a home energy manager (device) that analyses a power budget and that in response to an analysis result controls nodes (gates).

In US 2012/0280565 A1, the nodes take decisions based on rules, and the nodes inform the home energy manager afterwards.

SUMMARY OF THE INVENTION

It is an object of the invention to provide an improved device. It is a further object of the invention to provide an improved method, a computer program product and a medium.

According to a first aspect, a device is provided for controlling a first gate, the first gate being arranged to control a first amount of power to be supplied to a first load via a cable, the first gate being further arranged to send a first requesting signal to the device and receive a first instructing signal from the device, the device comprising
 a receiver for receiving the first requesting signal from the first gate,
 an analyzer for analyzing a first request defined by the first requesting signal in view of an available cable power capacity,
 a generator for in response to a first analysis result from the analyzer generating a first instruction for the first gate, and
 a transmitter for transmitting the first instructing signal defining the first instruction to the first gate.

A device controls a first gate. The first gate controls a first amount of power to be supplied to a first load via a cable. The first gate can send a first requesting signal to the device and can receive a first instructing signal from the device. The device comprises a receiver for receiving the first requesting signal from the first gate and a transmitter for transmitting a first instructing signal defining a first instruction to the first gate. The device further comprises an analyzer for analyzing a first request defined by the first requesting signal in view of an available cable power capacity and a generator for in response to a first analysis result from the analyzer generating the first instruction for the first gate. As a result, a device has been created that plays an active role in switching power. Compared to the prior art home energy manager, that is informed afterwards, the improved device is informed before power is switched and the improved device can decide how and/or when the power is switched. This is a great advantage.

The analyzer can analyze the first request defined by the first requesting signal in view of the available cable power capacity by for example determining a difference between the (momentary) total cable power capacity and a (momentarily) used cable power capacity as delivered to other loads via other gates and by for example comparing the determined difference with the first amount of power defined by the first request. The generator can generate in response to a first analysis result from the analyzer the first instruction for the first gate and can via this first instruction control the first gate. In case the determined difference is larger than the first amount of power, the device may for example decide to allow the first gate to switch this first amount of power. In case the determined difference is smaller than the first amount of power, the device may for example decide to allow the first gate to switch only a part of the first amount of power or not to switch at all.

The first requesting signal and the first instructing signal may be exchanged through wired communication and/or through wireless communication. Other kinds of signals are not to be excluded. The device may send an order signal to the gate to order data and may in response receive a data signal from the gate defining the data etc. The device may further send a control signal to the gate to control the gate and/or the load coupled to the gate etc. And the gate may send an information signal to the device to inform the device etc.

An embodiment of the device is defined by the analyzer being arranged to analyze the request defined by the first requesting signal in view of first-load-information about the first load. By using the first-load-information about the first load, the request can be analyzed in an improved way. The first-load-information may for example define a relative importance of the first load and/or a statistical behavior of the first load etc.

An embodiment of the device is defined by the first-load-information comprising steady-state-information and transient-state-information, each piece of information being supplied from the first load to the device or from the first gate to the device or from a server to the device. Many different loads can be distinguished, such as lighting loads, heating loads, pumping loads, air conditioning loads and motoring loads etc. Each load firstly requires a transient state current in a transient state and secondly requires a steady state current in a steady state. A transient state such as a switching state may last milliseconds or seconds or minutes before the steady state is reached. Per load, these two different kinds of current may differ much. By using the steady-state-information and transient-state-information about the first load, the request can be analyzed in a further improved way. Each piece of information may be supplied from the first load to the device or from the first gate to the device via the requesting signal or via another signal exchanged before or after an exchange of the requesting signal or may be supplied from a server to the device before or after an exchange of the requesting signal.

An embodiment of the device is defined by the cable being coupled to an auxiliary source via an auxiliary converter, the device further comprising
 a communicator for communication with the auxiliary converter and/or with the auxiliary source, and a predictor for predicting the available cable power capacity.

A communication may comprise the requesting signal, the instructing signal, the order signal and/or the data signal as discussed before, but may alternatively comprise other signals to be exchanged in a wired manner and/or in a wireless manner etc. A prediction may use one or more contents of one or more of these signals as communicated before.

An embodiment of the device is defined by the auxiliary source comprising a battery, the communication comprising a reception of battery-information defining a battery power capacity, the predictor being arranged to predict the available cable power capacity in view of the battery-information, and the generator being arranged to, in response to the analysis result from the analyzer, bring the battery into a first state for guiding energy to the battery or a second state for retrieving energy from the battery. When energy is guided via the cable to the battery, for example from another auxiliary source or from a main source, the battery is charged. When energy is retrieved from the battery and supplied to the cable, the battery is discharged. When the battery is fully charged, the predicted available cable power capacity may comprise or be based on the battery power capacity. When the battery is fully discharged, the predicted available cable power capacity cannot comprise and cannot be based on the battery power capacity.

An embodiment of the device is defined by the auxiliary source comprising a solar panel, the communication comprising a reception of solar-panel-information defining a solar panel power capacity, the predictor being arranged to predict the available cable power capacity in view of the solar-panel-information. During a sunny day, the solar panel may be used for powering the first load via the cable and/or for charging the battery. During a cloudy day and during a night, the solar panel can only be used in a reduced way or cannot be used at all.

An embodiment of the device is defined by the cable being further coupled to a main source via a main converter, the predictor being arranged to predict the available cable power capacity in view of a maximum power capacity of the main converter. Usually, a main source such as an AC mains supply can deliver more power than a main converter can handle and in that case a maximum power capacity of the main converter will be the bottle neck of the two. To keep costs under control, the maximum power capacity of the main converter should not be chosen much higher than necessary.

An embodiment of the device is defined by the predictor being arranged to predict the available cable power capacity in view of solar-panel-information, battery-information, weather-information and/or www-information. The predictor may use all kinds of information such as locally produced information (solar-panel-information, battery-information etc.) and non-locally produced information (weather-information, www-information etc.).

An embodiment of the device is defined by the cable being arranged to supply a DC voltage and a DC current to the first load. Preferably, the cable will be a DC power cable. In that case, each converter must produce a DC voltage and a DC current.

An embodiment of the device is defined by the device being arranged to control a second gate, the second gate being arranged to control a second amount of power to be supplied to a second load via the cable, the second gate being further arranged to send a second requesting signal to the device and receive a second instructing signal from the device, the receiver being arranged to receive the second requesting signal from the second gate, the analyzer being arranged to analyze a second request defined by the second requesting signal in view of the available cable power capacity, the generator being arranged to in response to a second analysis result from the analyzer generate a second instruction for the second gate, and the transmitter being arranged to transmit the second instructing signal defining the second instruction to the second gate. Usually, more than one load will be present, and each load or each group of loads will be controlled via a gate.

An embodiment of the device is defined by the first load receiving the first amount of power and the second gate having requested to transfer the second amount of power to the second load, the generator being arranged to temporarily reduce the first amount of power to be supplied to the first load until the second load is receiving the second amount of power. One way to solve a problem of a second load requiring a relatively large transient state current is realized by temporarily reducing the first amount of power as supplied to the first load. The first amount of power may even be reduced to zero to control the loads in a staggered manner.

An embodiment of the device is defined by the first load receiving the first amount of power and the second gate having requested to transfer the second amount of power to the second load, the generator being arranged to reduce the first amount of power to be supplied to the first load and to allow only a part of the second amount of power to be supplied to the second load. One way to solve a problem of a second load requiring a relatively large steady state current is realized by reducing the first amount of power as supplied to the first load and by allowing only a part of the second amount of power to be supplied to the second load. The reductions may be realized in a pulse powered manner.

According to a second aspect, a method is provided controlling a first gate, the first gate being arranged to control a first amount of power to be supplied to a first load via a cable, the first gate being further arranged to send a first requesting signal defining a first request and receive a first instructing signal defining a first instruction, the method comprising the steps of analyzing the first request in view of an available cable power capacity, and generating the first instruction for the first gate in response to a first analysis result.

According to a third aspect, a computer program product is provided for, when run via a computer, performing the steps of the method as defined above.

According to a fourth aspect, a medium is provided for storing and comprising the computer program product as defined above.

An insight is that a prior art home energy manager is informed afterwards. A basic idea is that an improved device should be informed beforehand by a gate and should control this gate.

A problem to provide an improved device has been solved. Further advantages are that a number of control options can be increased and that a quality of control can be improved and that a system can be designed more precisely and that a reliability of a system can be improved.

These and other aspects of the invention will be apparent from and elucidated with reference to the embodiments described hereinafter.

DETAILED DESCRIPTION OF EMBODIMENTS

Figure 1:
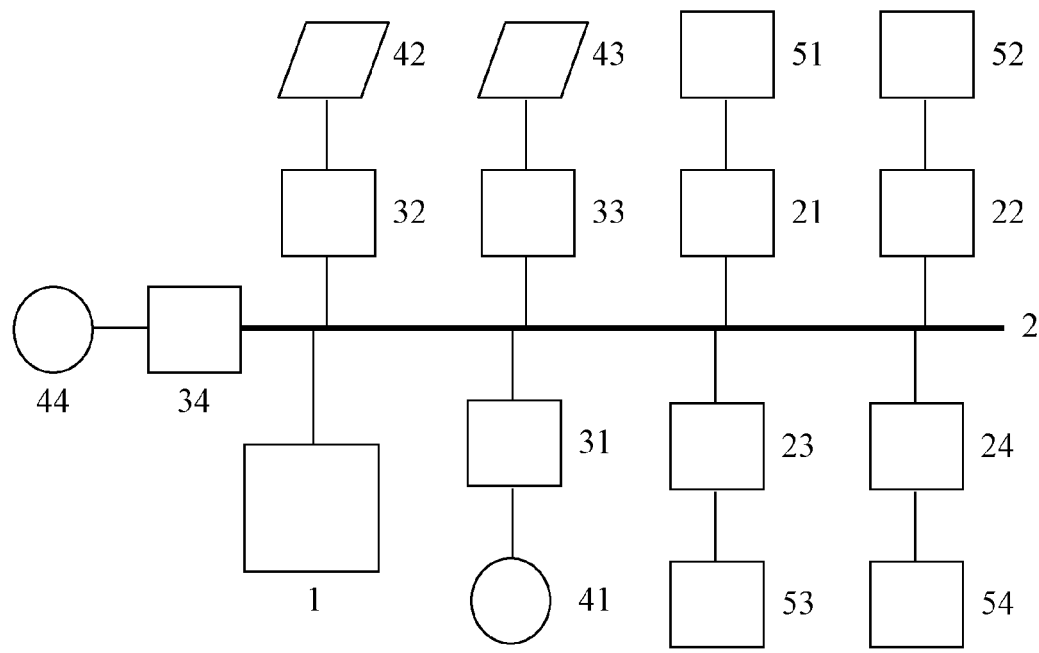
FIG. 1 shows a system comprising a device and comprising a cable coupled to sources via converters and coupled to loads via gates.

In the FIG. 1, a system, such as a building management system, is shown comprising a device 1 and comprising a cable 2 coupled to sources 41-44 via converters 31-34 and coupled to loads 51-54 via gates 21-24. The device 1 is coupled to the cable 2. The cable 2 is coupled to an auxiliary converter 31, that is further coupled to an auxiliary source in the form of a battery 41. The cable 2 is further coupled to auxiliary converters 32, 33, that are further coupled to auxiliary sources in the form of solar panels 42, 43. The cable 2 is coupled to a main converter 34, that is further coupled to a main source in the form of a mains supply 44. The cable 2 is further coupled to gates 21-24, that are further coupled to loads 51-54. The loads 51-54 may comprise lighting loads, heating loads, pumping loads, air conditioning loads and motoring loads etc. The cable 2 may be arranged to supply a DC voltage and a DC current to the loads 51-54 via the gates 21-24.

Figure 2:
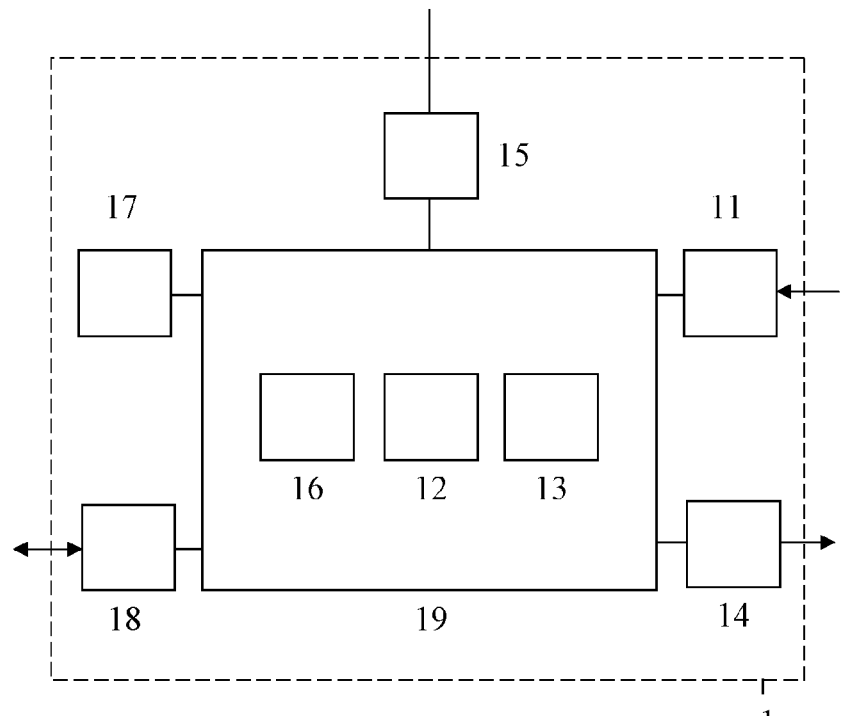
FIG. 2 shows an embodiment of a device.

In the FIG. 2, an embodiment of a device 1 is shown. The device 1 is arranged to control a first gate 21. The first gate 21 is arranged to control a first amount of power to be supplied to a first load 51 via the cable 2. The first gate 21 is further arranged to send a first requesting signal to the device 1 and receive a first instructing signal from the device 1. The device 1 comprises a receiver 11 for receiving the first requesting signal from the first gate 21, an analyzer 12 for analyzing a first request defined by the first requesting signal in view of an available cable power capacity, a generator 13 for in response to a first analysis result from the analyzer generating a first instruction for the first gate 21, and a transmitter 14 for transmitting the first instructing signal defining the first instruction to the first gate 21.

The receiver 11 and the transmitter 14 communicate in a wireless manner with the first gate 21, alternatively they may communicate in a wired manner with the first gate 21, via the cable 2 or via another wire not shown. Further, the receiver 11 and the transmitter 14 may form part of one transceiver.

The analyzer 12 is preferably arranged to analyze the request defined by the first requesting signal in view of first-load-information about the first load 51, such as for example a relative importance of the first load 51 and/or a statistical behavior of the first load 51 etc. The first-load-information may comprise steady-state-information and transient-state-information, owing to the fact that the first load may require a transient state current in a transient state and a steady state current in a steady state. Such a transient state such as a switching state may last milliseconds or seconds or minutes before the steady state is reached, and per load, these two different kinds of current may differ much. Each piece of information may be supplied from the first load 51 to the device 1 or from the first gate 21 to the device 1 via the requesting signal or another signal exchanged before or after an exchange of the requesting signal. Alternatively each piece of information may be supplied from a server to the device 1 via a modem 18, before or after an exchange of the requesting signal. When supplied before an exchange of the requesting signal, the device 1 is prepared for a coming situation. When supplied after an exchange of the requesting signal, the supply of information should be done relatively quickly.

The device 1 may further comprise a communicator 15 for communication with the auxiliary converters 31-33 (and/or with the auxiliary sources 41-43). Here, the communicator 15 is coupled to the cable 2 for communication in a wired manner, such as for example power line communication, but alternatively another wired and/or wireless communication may be realized. Here, the communicator 15 is different from the receiver 11 and the transmitter 14, but alternatively they may be the same.

The device 1 may further comprise a predictor 16 for predicting the available cable power capacity. For example in case the communication comprises a reception of battery-information defining a battery power capacity from the auxiliary converter 31, the predictor 16 may then be arranged to predict the available cable power capacity in view of the battery-information, and the generator 13 may then be arranged to, in response to the analysis result from the analyzer, bring the battery 41 into a first state for guiding energy to the battery 41 (charging) or a second state for retrieving energy from the battery 41 (de-charging). For example in case the communication comprises a reception of solar-panel-information defining a solar panel power capacity from the auxiliary converter 32, 33, the predictor 16 may then be arranged to predict the available cable power capacity in view of the solar-panel-information. The predictor 16 may further be arranged to predict the available cable power capacity in view of a maximum power capacity of the main converter 34, and may also be arranged to predict the available cable power capacity in view of weather-information and/or www-information etc.

Usually, the device 1 is arranged to control a second gate 22 (a third gate 23, a fourth gate 24 etc.). The second gate 22 is arranged to control a second amount of power to be supplied to a second load 52 via the cable 2. The second gate 22 is further arranged to send a second requesting signal to the device 1 and receive a second instructing signal from the device 1. The receiver 11 is arranged to receive the second requesting signal from the second gate 22. The analyzer 12 is arranged to analyze a second request defined by the second requesting signal in view of the available cable power capacity. The generator 13 is arranged to in response to a second analysis result from the analyzer 12 generate a second instruction for the second gate 22. The transmitter 14 is arranged to transmit the second instructing signal defining the second instruction to the second gate 22.

In case the first load 51 is receiving the first amount of power and the second gate 22 has requested to transfer the second amount of power to the second load 52, the generator 13 may temporarily reduce the first amount of power to be supplied to the first load 51 until the second load 52 is receiving the second amount of power. For example in case the second load 52 requires a relatively large transient state current and in case the first load 51 requires a relatively small transient state current, the first amount of power as supplied to the first load 51 may be temporarily reduced. The first amount of power may even be reduced to zero to control the loads 51, 52 in a staggered manner.

In case the first load 51 is receiving the first amount of power and the second gate 22 has requested to transfer the second amount of power to the second load 52, the generator 13 may reduce the first amount of power to be supplied to the first load 51 and may allow only a part of the second amount of power to be supplied to the second load 52. For example in case the second load 52 requires a relatively large steady state current, the first amount of power as supplied to the first load 51 may be reduced and only a part of the second amount of power is allowed to be supplied to the second load 52. The reductions may be realized in a pulse powered manner, for example in case of the loads 51, 52 being lamps, with the pulse powered manner preferably being not disturbing to the human eye.

In the FIG. 2, the analyzer 12, the generator 13 and the predictor 16 are hardware modules and/or software modules of a controller 19 that is coupled to the receiver 11, the transmitter 14, the communicator 15, a memory 17 and the modem 18. Alternatively, the analyzer 12, the generator 13 and the predictor 16 may be separate modules coupled to a controller 19, or one of the modules 12, 13 and 16 may comprise a controller 19 etc. The controller 19 may be a processor or a micro-controller etc.

Figure 3:
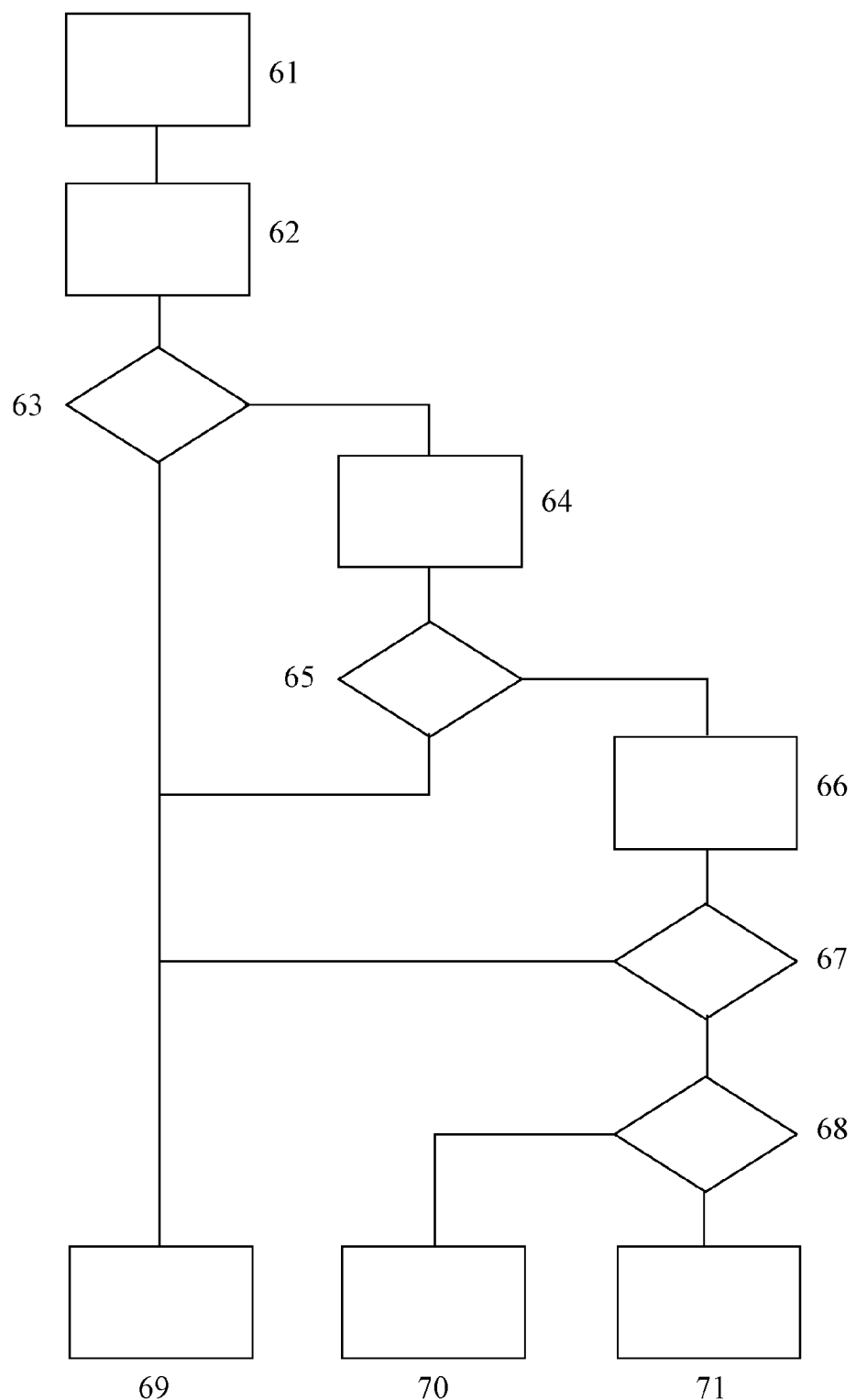
FIG. 3 shows a flow chart.

In the FIG. 3, a flow chart is shown, wherein the following blocks have the following meaning.

Block 61: Reception of a requesting signal defining a request from a requesting gate. Go to block 62.

Block 62: Analysis of the request defined by the requesting signal in view of an available cable power capacity, as predicted on-the-fly or shortly before, in view of a maximum power capacity of a main converter 34 and in view of solar-panel-information about solar panels 42, 43. Go to block 63.

Block 63: Can the requested transient state current and the requested steady state current be delivered by the available cable power capacity? If yes, go to block 69, if no, go to block 64.

Block 64: Control an auxiliary converter 31 to bring a battery 41 from a charging mode into a de-charging mode for supporting other sources 42-44. Go to block 65.

Block 65: Can the requested transient state current and the requested steady state current be delivered by the available cable power capacity now also comprising a battery power capacity? If yes, go to block 69, if no, go to block 66.

Block 66: Control other gates to other already active loads in a staggered manner or control the other gates of already active loads having a relatively small transient current to temporarily switch off these already active loads. Go to block 67.

Block 67: Can the requested transient state current now be delivered by the available cable power capacity? If yes, go to block 69, if no, go to block 68.

Block 68: Can the requested transient state current be delivered with a modified control? If yes, go to block 70, if no, go to block 71.

Block 69: Control the requesting gate to transfer the full amount of power.

Block 70: Control the other gates to already active lighting loads for dimming these active loads in a staggered manner or in a pulse powered manner, and control the requesting gate to transfer the full amount of power or a part thereof.

Block 71: Control the requesting gate to not allow a transfer of power.

The flow chart in the FIG. 3 starts with a reception of a requesting signal defining a request from a requesting gate (block 61). Then, an analysis of the request defined by the requesting signal is made in view of an available cable power capacity, as predicted on-the-fly. Alternatively, the analysis may be made in view of an available cable power capacity, as predicted shortly before, for example on a regular basis. The prediction of the available cable power capacity is made in view of a maximum power capacity of the main converter 34 and in view of solar-panel-information about the solar panels 42, 43, by for example adding a maximum power capacity of the main converter 34 and the momentary power capacities of the solar panels 42, 43 and by subtracting a used cable power capacity as presently delivered to already active loads (block 62). The prediction may further be based on weather-information and/or www-information etc.

Then, the requested transient state current and the requested steady state current are compared with an available current as possible in view of the available cable power capacity. If they can be delivered, the requesting gate is controlled to transfer the full amount of power (block 69), if they cannot be delivered, the auxiliary converter 31 is controlled to bring the battery 41 from a charging mode (a power receiving mode) into a de-charging mode (a power supplying mode) for supporting the other sources 42-44 (block 64).

Then, the requested transient state current and the requested steady state current are compared with an available current as possible in view of the available cable power capacity now also comprising a battery power capacity. If they can be delivered, the requesting gate is controlled to transfer the full amount of power (block 69), if they cannot be delivered, the other gates to the already active loads are controlled in a staggered manner or the other gates of already active loads having a relatively small transient current are controlled to temporarily switch off these active loads (block 66).

Then, the requested transient state current is compared with an available current as possible in view of the available cable power capacity. If it can be delivered, the requesting gate is controlled to transfer the full amount of power (block 69), if it cannot be delivered, it is investigated whether the requested transient state current can be delivered with a modified control. A modified control may comprise a (temporary) reduction of power supplied to other already active loads or (temporarily) switching off one or more other already active loads or changing a control of one or more other already active loads or bringing one or more other already active loads into another power mode etc. If a modified control would allow the requested transient state current to be supplied, for example other gates to already active lighting loads are controlled for dimming these active lighting loads in a staggered manner or in a pulse powered manner or one or more other gates to already active loads are controlled to change a control or a power mode of these active loads etc., and the requesting gate is controlled to transfer the full amount of power or a part thereof (block 70). If a modified control would not allow the requested transient state current to be supplied, the requesting gate is informed that a transfer of power is not allowed.

Instead of comparing a requested transient state current and/or a requested steady state current with an available current as possible in view of the available cable power capacity, a requested transient state amount of power and/or a requested steady state amount of power may be compared with an amount of power available via the cable 2 etc. A power outage or power failure of a main source may change an available cable power capacity, and an available cable power capacity may be predicted or calculated in view of a chance of such a power outage or power failure of the main source. An auxiliary source in the form of a generator such as for example a fuel generator such as a diesel generator may be introduced for temporarily overcoming transient requirements. Already activated loads that at start-up require relatively large transient currents or relatively much transient power are preferably not to be switched off completely for a relatively short amount of time, unless relatively necessary.

Two elements may be coupled directly without a third element being in between and may be coupled indirectly with a third element being in between.

Summarizing, devices 1 for controlling gates 21-24 arranged to control amounts of power to be supplied to loads 51-54 via cables 2 may comprise receivers 11 for receiving requesting signals from the gates 21-24, analyzers 12 for analyzing requests defined by the requesting signals in view of available cable power capacities, generators 13 for in response to analysis results generating instructions for the gates 21-24 and transmitters for transmitting instructing signals defining the instructions to the gates 21-24. The analyzers 12 may analyze the requests in view of load-information comprising steady-state-information / transient-state-information. The devices 1 may comprise communicators 15 for communication with auxiliary converters 31-33 coupled to auxiliary sources 41-43 such as batteries 41 and solar panels 42, 43 and may comprise predictors 16 for predicting the available cable power capacities. The improved devices 1 are no longer informed afterwards by the gates 21-24 but are informed beforehand by the gates 21-24 and control these gates 21-24 in response to the analysis results.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A device for controlling a first power switching unit, the first switching unit being arranged to control a first amount of power to be supplied to a first load via a cable, the first power switching unit being further arranged to send a first requesting signal to the device and receive a first instructing signal from the device, the device comprising
    a receiver for receiving the first requesting signal from the first power switching unit,
    an analyzer for analyzing a first request defined by the first requesting signal in view of an available cable power capacity, wherein said analyzer is adapted for determining a difference between the total cable power capacity and a used cable power capacity as delivered to other loads on the cable and comparing the determined difference with the first amount of power defined by the first request,
    a generator for in response to a first analysis result from the analyzer generating a first instruction for the first power switching unit wherein said first instruction is to allow the first power switching unit to switch this first amount of power, or to switch only a part of the first amount of power, or not to switch at all according to the first analysis result, and
    a transmitter for transmitting the first instructing signal defining the first instruction to the first power switching unit.

2. The device as defined in claim 1, the analyzer being arranged to analyze the request defined by the first requesting signal in view of first-load-information about the first load.

3. The device as defined in claim 2, the first-load-information comprising steady-state-information and transient-state-information, each piece of information being supplied from the first load to the device or from the first power switching unit to the device or from a server to the device.

4. The device as defined in claim 1, the cable being coupled to an auxiliary source via a second converter, the device further comprising
    a communicator for communication with the second converter and/or with the auxiliary source, and
    a predictor for predicting the available cable power capacity through determining the available cable power capacity as the difference between the total cable power capacity and a used cable power capacity as delivered to other loads on the cable.

5. The device as defined in claim 4, the auxiliary source comprising a battery, the communication comprising a reception of battery-information defining a battery power capacity, the predictor being arranged to predict the available cable power capacity in view of the battery-information, and the generator being arranged to, in response to the analysis result from the analyzer,
    bring the battery into a charging state and guide energy to the battery or
    bring the battery into a discharging state and retrieve energy from the battery.

6. The device as defined in claim 4, the auxiliary source comprising a solar panel, the communication comprising a reception of solar-panel-information defining a solar panel power capacity, the predictor being arranged to predict the available cable power capacity in view of the solar-panel-information.

7. The device as defined in claim 4, the cable being further coupled to a main source via a first converter, the predictor being arranged to predict the available cable power capacity in view of a maximum power capacity of the first converter, wherein the predictor determining the available cable power capacity as the difference between the total cable power capacity and a used cable power capacity as delivered to other loads on the cable.

8. The device as defined in claim 4, the predictor being arranged to predict the available cable power capacity in view of solar-panel-information, battery-information, and/or weather-information.

9. The device as defined in claim 1, the cable being arranged to supply a DC voltage and a DC current to the first load.

10. The device as defined in claim 1, the device being arranged to control a second power switching unit, the second power switching unit being arranged to control a second amount of power to be supplied to a second load via the cable, the second power switching unit being further arranged to send a second requesting signal to the device and receive a second instructing signal from the device, the receiver being arranged to receive the second requesting signal from the second power switching unit, the analyzer being arranged to analyze a second request defined by the second requesting signal in view of the available cable power capacity, the generator being arranged to in response to a second analysis result from the analyzer generate a second instruction for the second power switching unit, and the transmitter being arranged to transmit the second instructing signal defining the second instruction to the second power switching unit.

11. The device as defined in claim 10, the first load receiving the first amount of power and the second power switching unit having requested to transfer the second amount of power to the second load, the generator being arranged to temporarily reduce the first amount of power to be supplied to the first load until the second load is receiving the second amount of power.

12. The device as defined in claim 10, the first load receiving the first amount of power and the second power switching unit having requested to transfer the second amount of power to the second load, the generator being arranged to reduce the first amount of power to be supplied to the first load and to allow only a part of the second amount of power to be supplied to the second load.

13. A method for controlling a first power switching unit, the first power switching unit being arranged to control a first amount of power to be supplied to a first load via a cable, the first power switching unit being further arranged to send a first requesting signal defining a first request and receive a first instructing signal defining a first instruction, the method comprising the steps of analyzing the first request in view of an available cable power capacity, wherein said analyzer is adapted for determining a difference between the total cable power capacity and a used cable power capacity as delivered to other loads on the cable and comparing the determined difference with the first amount of power defined by the first request, and generating the first instruction for the first power switching unit in response to a first analysis result, wherein said first instruction is to allow the first power switching unit to switch this first amount of power, or to switch only a part of the first amount of power or not to switch at all according to the first analysis result.

14. A computer program product for, when run via a computer, performing the steps of the method as defined in claim 13.

15. A medium for storing and comprising the computer program product as defined in claim 14.

\* \* \* \* \*